(12) United States Patent
Prigg et al.

(10) Patent No.: US 9,912,533 B1
(45) Date of Patent: Mar. 6, 2018

(54) SERDES CHANNEL OPTIMIZATION

(71) Applicant: Netronome Systems, Inc., Santa Clara, CA (US)

(72) Inventors: Brenda Prigg, Cranberry Township, PA (US); Michael Sobczak, Pittsburgh, PA (US); Robert Charles Drummond, Mars, PA (US)

(73) Assignee: Netronome Systems, Inc., Santa Clara, CA (US)

( * ) Notice: Subject to any disclaimer, the term of this patent is extended or adjusted under 35 U.S.C. 154(b) by 121 days.

(21) Appl. No.: 14/731,370

(22) Filed: Jun. 4, 2015

(51) Int. Cl.
*H04L 12/24* (2006.01)
*H04L 12/26* (2006.01)

(52) U.S. Cl.
CPC ........ *H04L 41/0803* (2013.01); *H04L 43/062* (2013.01)

(58) Field of Classification Search
CPC ........... H04W 40/00; H04B 7/17; H04B 7/14; H04L 27/01; H04L 27/06; H04L 41/0803; H04L 43/062
See application file for complete search history.

(56) References Cited

U.S. PATENT DOCUMENTS

| | | | |
|---|---|---|---|
| 2010/0158031 A1* | 6/2010 | Thomas | H04L 49/251 370/412 |
| 2012/0016650 A1* | 1/2012 | Hollis | G06F 17/5036 703/13 |
| 2012/0019668 A1* | 1/2012 | Seth-Smith | H04N 17/004 348/181 |

* cited by examiner

*Primary Examiner* — Anez Ebrahim
(74) *Attorney, Agent, or Firm* — Imperium Patent Works LLP; T. Lester Wallace; Mark D. Marrello

(57) ABSTRACT

An individual score is generated for a first combination of a transmitter configuration value and a receiver configuration value. The transmitter configuration is used to configure a first physical layer circuit and the receiver configuration is used to configure a second physical layer circuit. The individual score is based on measured characteristics observed by the second physical layer circuit in response to the first configuration combination. A neighbor weighted score is then generated for the first configuration combination. The neighbor weighted score is based on measured characteristics observed by the second physical layer circuit in response to a second configuration combination that is within a first distance from the first configuration combination within a multidimensional array of configuration combinations. The individual score is summed with the neighbor weighted score to generate a final neighbor weighted score for the first configuration combination.

13 Claims, 16 Drawing Sheets

OPTICAL TRANSCEIVER AND FLOW PROCESSOR
ON A LINE CARD IN A NETWORK DEVICE

OPTICAL TRANSCEIVER AND FLOW PROCESSOR
ON A LINE CARD IN A NETWORK DEVICE

MANAGEMENT CARD (MOTHERBOARD) BLOCK DIAGRAM

PHY BLOCK DIAGRAM

| BITS | FIELD | TYPE | DEFAULT | DESCRIPTION |
|---|---|---|---|---|
| 11-7 | MAIN STRENGTH | R/W | 00100 | 11111 = MAXIMUM TRANSMIT POWER<br>00000 = MINIMUM TRANSMIT POWER |
| 6-4 | PRECURSER AMPLITUDE | R/W | 010 | 111 = MAXIMUM PRECURSER AMPLITUDE<br>000 = MINIMUM PRECURSER AMPLITUDE |
| 3-0 | POST CURSOR AMPLITUDE | R/W | 0100 | 1111 = MAXIMUM POST CURSOR AMPLITUDE<br>0000 = MINIMUM POST CURSOR AMPLITUDE |

PHY TRANSMIT CONFIGURATION REGISTER

FIG. 4

| BITS | FIELD | TYPE | DEFAULT | DESCRIPTION |
|---|---|---|---|---|
| 17-14 | SIGNAL THRESHOLD | R/W | 0100 | 1111 = MAXIMUM SIGNAL THRESHOLD<br>0000 = MINIMUM SIGNAL THRESHOLD |
| 13-9 | EQUALIZATION | R/W | 01000 | CONTROL EQUALIZATION APPLIED TO RECEIVED SIGNAL. |
| 8-4 | FILTER | R/W | 01000 | SETS TYPE AND BANDWIDTH OF FILTERING. |
| 3-0 | GAIN | R/W | 0100 | 1111 = MAXIMUM GAIN<br>0000 = MINIMUM GAIN |

PHY RECEIVER CONFIGURATION REGISTER

FIG. 5

NEIGHBOR WEIGHTED SCORING
OVERVIEW FLOWCHART

| TRANSMITTER CONFIGURATION VALUES | | | RECEIVER CONFIGURATION VALUES | | | | MEASURED CHARACTERISTICS | | |
|---|---|---|---|---|---|---|---|---|---|
| MAIN STRENGTH (5-BITS) | PRECURSOR (3-BITS) | POST CURSOR (4-BITS) | SIGNAL THRESHOLD (4-BITS) | EQUALIZATION (5-BITS) | FILTER (5-BITS) | GAIN (4-BITS) | BER | EYE HEIGHT | EYE WIDTH |
| 00000 | 000 | 0000 | 0000 | 00000 | 00000 | 0000 | # | # | # |
| 00000 | 000 | 0000 | 0000 | 00000 | 00000 | 0001 | # | # | # |
| 00000 | 000 | 0000 | 0000 | 00000 | 00000 | 0010 | # | # | # |
| ↓ | ↓ | ↓ | ↓ | ↓ | ↓ | ↓ | ↓ | ↓ | ↓ |
| 11111 | 1111111 | 1111 | 1111 | 11111 | 11111 | 1111 | # | # | # |

MULTIDIMENSIONAL ARRAY OF CONFIGURATION
COMBINATIONS

FIG. 7

| DISTANCE FROM SELECTED COMBINATION | -2 | -1 | 0 | 1 | 2 |
|---|---|---|---|---|---|
| WEIGHT FACTOR | 0.05 | 0.15 | 1 | 0.15 | 0.05 |

WEIGHT FACTOR TABLE FOR PRECUSOR VALUES

FIG. 8

| DISTANCE FROM SELECTED COMBINATION | -2 | -1 | 0 | 1 | 2 |
|---|---|---|---|---|---|
| WEIGHT FACTOR | 0.10 | 0.30 | 1 | 0.30 | 0.10 |

WEIGHT FACTOR TABLE FOR POST CURSOR VALUES

FIG. 9

| DISTANCE FROM SELECTED COMBINATION | -2 | -1 | 0 | 1 | 2 |
|---|---|---|---|---|---|
| WEIGHT FACTOR | 0.25 | 0.40 | 1 | 0.40 | 0.25 |

WEIGHT FACTOR TABLE FOR MAIN STRENGTH VALUES

FIG. 10

| MAIN STRENGTH (5-BITS) | TRANSMITTER CONFIGURATION VALUES | | | RECEIVER CONFIGURATION VALUES | | | | MEASURED CHARACTERISTICS | | |
|---|---|---|---|---|---|---|---|---|---|---|
| | PRECURSOR (3-BITS) | POST CURSOR (4-BITS) | SIGNAL THRESHOLD (4-BITS) | EQUALIZATION (5-BITS) | FILTER (5-BITS) | GAIN (4-BITS) | BER | EYE HEIGHT | EYE WIDTH | |
| 00001 | 011 | 0011 | 0011 | 00011 | 00011 | 0011 | # | # | # | 2 UNITS AWAY IN MAIN STRENGTH DIMENSION |
| 00010 | 011 | 0011 | 0011 | 00011 | 00011 | 0011 | # | # | # | 1 UNIT AWAY IN MAIN STRENGTH DIMENSION |
| 00011 | 011 | 0011 | 0011 | 00011 | 00011 | 0011 | # | # | # | SELECTED COMBINATION |
| 00100 | 011 | 0011 | 0011 | 00011 | 00011 | 0011 | # | # | # | 1 UNIT AWAY IN MAIN STRENGTH DIMENSION |
| 00101 | 011 | 0011 | 0011 | 00011 | 00011 | 0011 | # | # | # | 2 UNITS AWAY IN MAIN STRENGTH DIMENSION |

NEIGHBORING COMBINATIONS IN THE MAIN STRENGTH DIMENSION

FIG. 11

| | Transmitter Configuration Values | | | Receiver Configuration Values | | | | Measured Characteristics | | |
|---|---|---|---|---|---|---|---|---|---|---|
| | MAIN STRENGTH (5-BITS) | PRECURSOR (3-BITS) | POST CURSOR (4-BITS) | SIGNAL THRESHOLD (4-BITS) | EQUALIZATION (5-BITS) | FILTER (5-BITS) | GAIN (4-BITS) | BER | EYE HEIGHT | EYE WIDTH |
| 2 UNITS AWAY IN PRECURSOR DIMENSION | 00011 | 001 | 0011 | 0011 | 00011 | 00011 | 0011 | # | # | # |
| 1 UNIT AWAY IN PRECURSOR DIMENSION | 00011 | 010 | 0011 | 0011 | 00011 | 00011 | 0011 | # | # | # |
| SELECTED COMBINATION | 00011 | 011 | | | 00011 | | | # | # | # |
| 1 UNIT AWAY IN PRECURSOR DIMENSION | 00011 | 100 | 0011 | 0011 | 00011 | 00011 | 0011 | # | # | # |
| 2 UNITS AWAY IN PRECURSOR DIMENSION | 00011 | 101 | 0011 | 0011 | 00011 | 00011 | 0011 | # | # | # |

NEIGHBORING COMBINATIONS IN THE PRECURSOR DIMENSION

FIG. 12

| | TRANSMITTER CONFIGURATION VALUES | | | RECEIVER CONFIGURATION VALUES | | | | MEASURED CHARACTERISTICS | | |
|---|---|---|---|---|---|---|---|---|---|---|
| | MAIN STRENGTH (5-BITS) | PRECURSOR (3-BITS) | POST CURSOR (4-BITS) | SIGNAL THRESHOLD (4-BITS) | EQUALIZATION (5-BITS) | FILTER (5-BITS) | GAIN (4-BITS) | BER | EYE HEIGHT | EYE WIDTH |
| 2 UNITS AWAY IN POST CURSOR DIMENSION | 00011 | 011 | 0001 | 0011 | 00011 | 00011 | 0011 | # | # | # |
| 1 UNIT AWAY IN POST CURSOR DIMENSION | 00011 | 011 | 0010 | 0011 | 00011 | 00011 | 0011 | # | # | # |
| SELECTED COMBINATION | 00011 | 011 | 0011 | | | | | # | # | # |
| 1 UNIT AWAY IN POST CURSOR DIMENSION | 00011 | 011 | 0100 | 0011 | 00011 | 00011 | 0011 | # | # | # |
| 2 UNITS AWAY IN POST CURSOR DIMENSION | 00011 | 011 | 0101 | 0011 | 00011 | 00011 | 0011 | # | # | # |

NEIGHBORING COMBINATIONS IN THE POST CURSOR DIMENSION

FIG. 13

| | TRANSMITTER CONFIGURATION VALUES | | | RECEIVER CONFIGURATION VALUES | | | | MEASURED CHARACTERISTICS | | |
|---|---|---|---|---|---|---|---|---|---|---|
| | MAIN STRENGTH (5-BITS) | PRECURSOR (3-BITS) | POST CURSOR (4-BITS) | SIGNAL THRESHOLD (4-BITS) | EQUALIZATION (5-BITS) | FILTER (5-BITS) | GAIN (4-BITS) | BER | EYE HEIGHT | EYE WIDTH |
| 2 UNITS AWAY IN SIGNAL THRESHOLD DIMENSION | 00011 | 011 | 0011 | 0001 | 00011 | 00011 | 0011 | # | # | # |
| 1 UNIT AWAY IN SIGNAL THRESHOLD DIMENSION | 00011 | 011 | 0011 | 0010 | 00011 | 00011 | 0011 | # | # | # |
| SELECTED COMBINATION | 00011 | 011 | 0011 | 0011 | 00011 | 00011 | 0011 | # | # | # |
| 1 UNIT AWAY IN SIGNAL THRESHOLD DIMENSION | 00011 | 011 | 0011 | 0100 | 00011 | 00011 | 0011 | # | # | # |
| 2 UNITS AWAY IN SIGNAL THRESHOLD DIMENSION | 00011 | 011 | 0011 | 0101 | 00011 | 00011 | 0011 | # | # | # |

NEIGHBORING COMBINATIONS IN THE SIGNAL THRESHOLD DIMENSION

FIG. 14

| | TRANSMITTER CONFIGURATION VALUES | | | RECEIVER CONFIGURATION VALUES | | | | MEASURED CHARACTERISTICS | | |
|---|---|---|---|---|---|---|---|---|---|---|
| | MAIN STRENGTH (5-BITS) | PRECURSOR (3-BITS) | POST CURSOR (4-BITS) | SIGNAL THRESHOLD (4-BITS) | EQUALIZATION (5-BITS) | FILTER (5-BITS) | GAIN (4-BITS) | BER | EYE HEIGHT | EYE WIDTH |
| 2 UNITS AWAY IN EQUALIZATION DIMENSION | 00011 | 011 | 0011 | 0011 | 00001 | 00011 | 0011 | # | # | # |
| 1 UNIT AWAY IN EQUALIZATION DIMENSION | 00011 | 011 | 0011 | 0011 | 00010 | 00011 | 0011 | # | # | # |
| SELECTED COMBINATION | 00011 | 011 | 0011 | 0011 | 00011 | 00011 | 0011 | # | # | # |
| 1 UNIT AWAY IN EQUALIZATION DIMENSION | 00011 | 011 | 0011 | 0011 | 00100 | 00011 | 0011 | # | # | # |
| 2 UNITS AWAY IN EQUALIZATION DIMENSION | 00011 | 011 | 0011 | 0011 | 00101 | 00011 | 0011 | # | # | # |

NEIGHBORING COMBINATIONS IN THE EQUALIZATION DIMENSION

FIG. 15

| | TRANSMITTER CONFIGURATION VALUES | | | RECEIVER CONFIGURATION VALUES | | | | MEASURED CHARACTERISTICS | | |
|---|---|---|---|---|---|---|---|---|---|---|
| | MAIN STRENGTH (5-BITS) | PRECURSOR (3-BITS) | POST CURSOR (4-BITS) | SIGNAL THRESHOLD (4-BITS) | EQUALIZATION (5-BITS) | FILTER (5-BITS) | GAIN (4-BITS) | BER | EYE HEIGHT | EYE WIDTH |
| 2 UNITS AWAY IN FILTER DIMENSION | 00011 | 011 | 0011 | 0011 | 00011 | 00001 | 0011 | # | # | # |
| 1 UNIT AWAY IN FILTER DIMENSION | 00011 | 011 | 0011 | 0011 | 00011 | 00010 | 0011 | # | # | # |
| SELECTED COMBINATION | 00011 | 011 | 0011 | 0011 | 00011 | 00011 | 0011 | # | # | # |
| 1 UNIT AWAY IN FILTER DIMENSION | 00011 | 011 | 0011 | 0011 | 00011 | 00100 | 0011 | # | # | # |
| 2 UNITS AWAY IN FILTER DIMENSION | 00011 | 011 | 0011 | 0011 | 00011 | 00101 | 0011 | # | # | # |

NEIGHBORING COMBINATIONS IN THE FILTER DIMENSION

FIG. 16

|  | TRANSMITTER CONFIGURATION VALUES | | | RECEIVER CONFIGURATION VALUES | | | | MEASURED CHARACTERISTICS | | |
|---|---|---|---|---|---|---|---|---|---|---|
|  | MAIN STRENGTH (5-BITS) | PRECURSOR (3-BITS) | POST CURSOR (4-BITS) | SIGNAL THRESHOLD (4-BITS) | EQUALIZATION (5-BITS) | FILTER (5-BITS) | GAIN (4-BITS) | BER | EYE HEIGHT | EYE WIDTH |
| 2 UNITS AWAY IN GAIN DIMENSION | 00011 | 011 | 0011 | 0011 | 00011 | 00011 | 0001 | # | # | # |
| 1 UNIT AWAY IN GAIN DIMENSION | 00011 | 011 | 0011 | 0011 | 00011 | 00011 | 0010 | # | # | # |
| SELECTED COMBINATION | 00011 | 011 | 0011 | 0011 | 00011 | 00011 | 0011 | # | # | # |
| 1 UNIT AWAY IN GAIN DIMENSION | 00011 | 011 | 0011 | 0011 | 00011 | 00011 | 0100 | # | # | # |
| 2 UNITS AWAY IN GAIN DIMENSION | 00011 | 011 | 0011 | 0011 | 00011 | 00011 | 0101 | # | # | # |

NEIGHBORING COMBINATIONS IN THE GAIN DIMENSION

FIG. 17

CHANNEL OPTIMIZATION FLOWCHART

SERDES CHANNEL OPTIMIZATION

TECHNICAL FIELD

The described embodiments relate generally to SERDES channel optimization and automation thereof that determines optimized configurations for transmitter and receiver physical layer circuits.

SUMMARY

In a first novel aspect, a first physical layer circuit is configured using a first transmitter configuration and a second physical layer circuit is configured using a first receiver configuration. A test bit stream is selected and is output by the first physical layer unit. The test bit stream, the first transmitter configuration and the second receiver configuration is stored in a memory device. The test bit stream is then transmitted by the first physical layer circuit via a channel to the second physical layer circuit. Characteristics of the test bit stream after passing through the channel are measured in the second physical layer circuit, thereby generating a multidimensional array of measured characteristics that is organized by transmitter configuration and receiver configuration combinations.

In a second novel aspect, an individual score is generated for a first combination of a transmitter configuration value and a receiver configuration value. The transmitter configuration is used to configure a first physical layer circuit and the receiver configuration is used to configure a second physical layer circuit. The individual score is based on measured characteristics observed by the second physical layer circuit in response to the first configuration combination. An iterative process begins to obtain individual scores for all possible configuration combinations. Upon completion, a neighbor weighted score is then generated for each configuration combination. The neighbor weighted score is based on measured characteristics observed by the second physical layer circuit in response to a second configuration combination that is within a first distance from the first configuration combination within a multidimensional array of configuration combinations. The individual score is summed with the neighbor weighted score to generate a final neighbor weighted score for the first combination.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4 is a table illustrating exemplary transmitter physical layer circuit configuration registers.

FIG. 5 is a table illustrating exemplary receiver physical layer circuit configuration registers.

FIG. 7 is a diagram illustrating a multidimensional array of transmitter-receiver configuration combinations.

FIG. 8 illustrates a weighting factor table for precursor values.

FIG. 9 illustrates a weighting factor table for post cursor values.

FIG. 10 illustrates a weighting factor table for main strength values.

FIG. 11 is a diagram illustrating neighboring combinations in the main strength dimension.

FIG. 12 is a diagram illustrating neighboring combinations in the precursor dimension.

FIG. 13 is a diagram illustrating neighboring combinations in the post cursor dimension.

FIG. 14 is a diagram illustrating neighboring combinations in the signal threshold dimension.

FIG. 15 is a diagram illustrating neighboring combinations in the equalization dimension.

FIG. 16 is a diagram illustrating neighboring combinations in the filter dimension.

FIG. 17 is a diagram illustrating neighboring combinations in the gain dimension.

DETAILED DESCRIPTION

Reference will now be made in detail to background examples and some embodiments of the invention, examples of which are illustrated in the accompanying drawings. In the description and claims below, relational terms (such as "upper", "uppermost", "topmost", "lower", "bottom", "bottommost", "left" and "right") may be used to describe relative orientations between different parts of a structure being described, and it is to be understood that the overall structure being described can actually be oriented in any way in three-dimensional space.

Even with all best efforts to eliminate channel marginality in high speed network devices via pre-layout methods such as lane Input/output Buffer Information Specification (IBIS) simulations, there is still a chance printed circuit board materials, vias affecting trace length routes, or noise on the board could compromise signal integrity. Accordingly, a serialization-deserialization (SERDES) channel optimization method to manage post layout support of hardware bring up, specifically targeting transmitter and receiver sweeping for SERDES multi-mode interfaces is needed.

Figure 1:
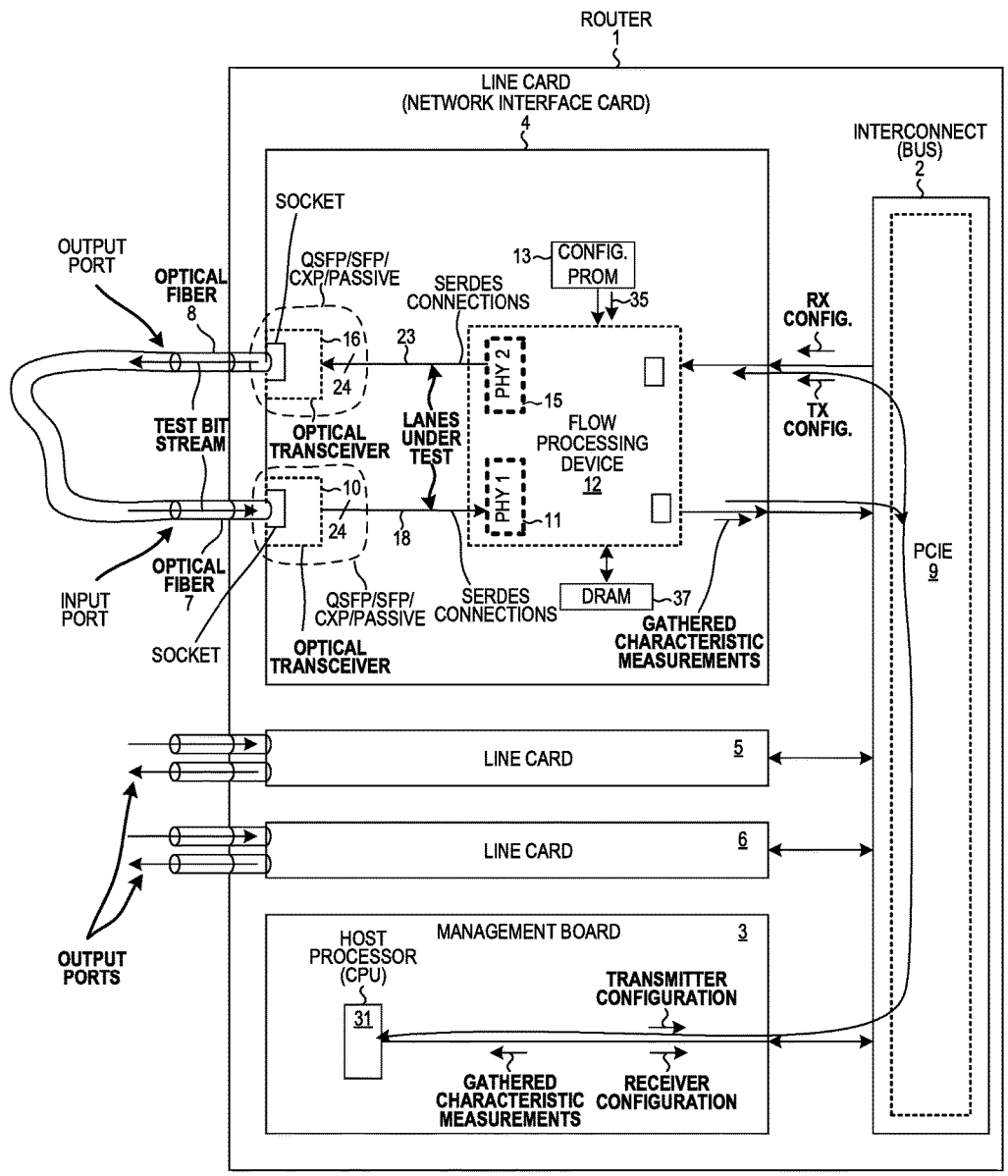
FIG. 1 is a simplified diagram of a router 1.

FIG. 1 is a simplified diagram of a router 1. Router 1 includes a interconnect 2, a management board 3, and line cards 4-6. Each of the line cards can receive 100 Gbps (gigabits per second) packet traffic from another network via a fiber optic cable 7 and also can transmit 100 Gbps packet traffic to another network via another fiber optic cable 8. Line cards 4-6 are of identical construction. In this example, flows of packets are received into line card 4 from a network via the fiber optic cable 7 or from the switch fabric 9. Certain functions then need to be performed on the line card including looking up MPLS labels, determining destinations for incoming flows of packets, and scheduling the transmitting of flows of packets. Packets of the flows pass from the line card 4 and out either to the network via optical cable 8 or to the switch fabric 9. SERDES optimization is needed to avoid data integrity issues.

Line card 4 includes a first optical transceiver 10, a first PHY integrated core 11 embedded within a flow processing device 12, a configuration Programmable Read Only Memory (PROM) 13, an external memory such as Dynamic Random Access Memory (DRAM) 37, a second PHY integrated core 15 embedded within flow processing device 12, and a second optical transceiver 16. Packet data received from the network via optical cable 7 is converted into electrical signals by optical transceiver 10. PHY integrated core 11 receives the packet data in electrical form from optical transceiver 10 via SerDes connections 18. In the present example set forth here, the flow processing device 12 is an instance of the Island-Based Network Flow Processor integrated circuit (IB-NFP) set forth in U.S. patent application Ser. No. 13/399,888, entitled "Island-Based Network Flow Processor Integrated Circuit", filed Feb. 17, 2012, by Gavin J. Stark et al. (the subject matter of which is incorporated herein by reference). In one example, the flows of packets into the IB-NFP integrated circuit from optical cable 7 is 100 Gbps traffic. The first PHY integrated core 11 within the IB-NFP integrated circuit 12 receives the packet data in serialized form from SerDes connections 18, deserializes the packet data, and outputs packet data in deserialized form to digital circuitry within IB-NFP integrated circuit 12. In another embodiment (not shown), line card 4 does not include optical transceivers but rather RJ-45 connectors connect the SERDES connections to an Ethernet cable.

Similarly, IB-NFP integrated circuit 12 may output 100 Gbps packet traffic to optical cable 8. The second PHY integrated core 15 within the IB-NFP integrated circuit 12 receives the packet data in deserialized form from digital circuitry within integrated circuit 12. The second PHY integrated core 15 outputs the packet data in serialized form onto SerDes connections 23 to optical transceiver 16. Optical transceiver 16 converts the packet data into optical form and drives the optical signals through optical cable 8. Accordingly, the first and second PHY integrated cores 11 and 15 within the IB-NFP integrated circuit 12 communicate packet data both into and out of the IB-NFP integrated circuit 12.

Figure 2:
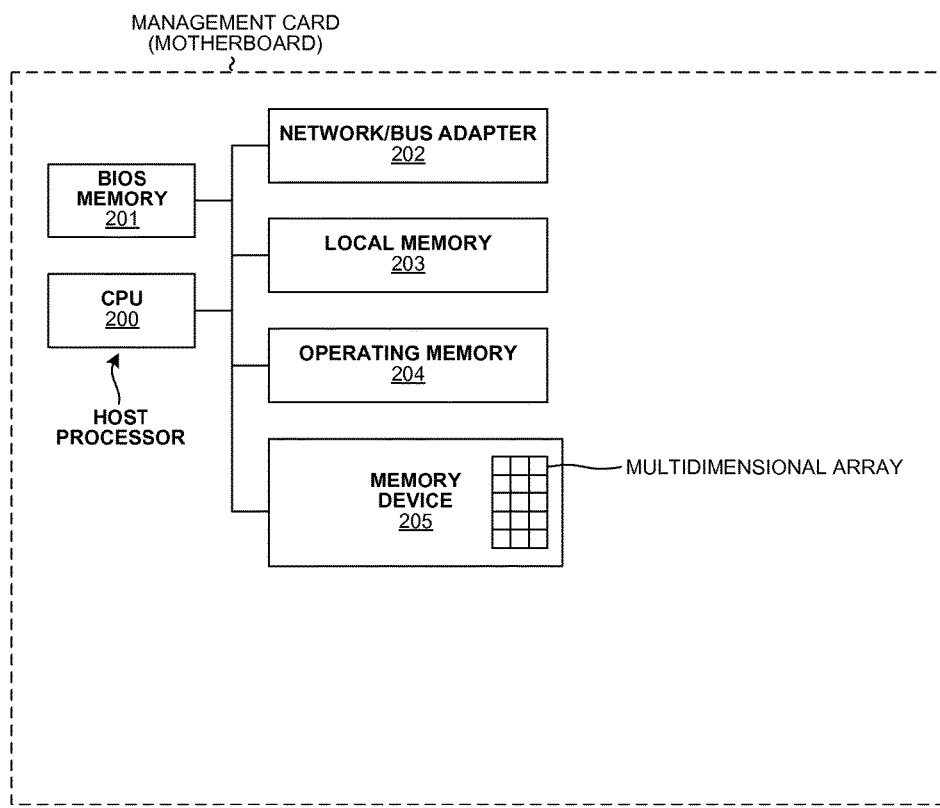
FIG. 2 is a block diagram illustrating the contents of a management card.

Management board 3 includes a CPU (Central Processing Unit) 31. CPU 31 handles router management functions including the configuring of the IB-NFP integrated circuits on the various line cards 4-6. CPU 31 communicates with the IB-NFP integrated circuits via dedicated PCIE connections. The configuration information passes from CPU 31 to IB-NFP integrated circuit 12 via PCIE 9. FIG. 2 is a block diagram illustrating the contents of a management card. The management card includes a CPU 200, a Basic Input/Output System (BIOS) memory 201, a network bus adapter 202, a local memory 203 (optional), an operating memory 204, and a large capacity memory device 205. In operation, the CPU causes measurement information received from the IB-NFP to be stored in large capacity memory device 205.

External configuration PROM (Programmable Read Only Memory) integrated circuit 13 stores other types of configuration information such as information that configures various lookup tables on the IB-NFP integrated circuit. This configuration information 35 is loaded into the IB-NFP integrated circuit 12 upon power up. As is explained in further detail below, IB-NFP integrated circuit 12 can store various types of information including buffered packet data in external DRAM integrated circuit 37.

In operation, host processor (CPU) 31 initiates the configuration of physical layer core (PHY 1) 11 and physical layer circuit (PHY 2) 15 and initiates the transmission of a test bit stream by physical layer core (PHY 2) via the flow processing device 12. In one example, the test bit stream is a Pseudorandom Binary Sequence (PRBS) signal stored in the flow processing device that is selected by the CPU. In other embodiments not illustrated, the test bit stream can be transmitted by the CPU to the flow processing device. In the illustrated embodiment, PHY 2 is a transmitter physical layer circuit and PHY 1 is a receiver physical layer circuit. In response to receiving the PHY 1 configuration values, the flow processing device causes the PHY 1 configuration values to be written to control registers located on PHY 1. In response to receiving the PHY 2 configuration values, the flow processing device causes the PHY 2 configuration information to be written to control registers located on PHY 2. After the configuration information has been written to the control registers on both PHY 1 and PHY 2, PHY 2 then outputs the test bit stream to the optical transceiver 16 via connections 23. The optical transceiver 16 is connected to optical fiber 8 via a socket. Optical fiber 8 is connected to optical fiber 7, which in turn is coupled to optical transceiver 10 via a socket. Optical transceiver 10 outputs the received test bit stream to PHY 1 via connections 18. The received test bit stream can also be referred to as a looped back test bit stream. In one example, the looped back test bit stream is communicated to the CPU for processing. In another example, the flow processing device processes the received test bit stream and generates characterization measurements that are communicated to the CPU for processing. Upon receiving either the received test bit stream or characterization measurements of the received test bit stream, the CPU receives or determines the Bit Error Rate (BER), eye height, and eye width. The BER, eye height, and eye width is stored in a memory device coupled to the CPU. This embodiment allows for the characterization of the communication between a first SERDES port of the flow processing device and a second SERDES port of the flow processing device. In one example, this operation is repeated for all possible combinations of transmitter (PHY 2) and receiver (PHY 1) configurations. In another example, this operation is repeated for all possible transmitter (PHY 2) configurations while the receiver (PHY 1) configuration is held constant. In a third example, this operation is repeated for all possible receiver (PHY 1) configurations while the transmitter (PHY 2) configuration is held constant. Based upon the characteristics of the received test bit stream (e.g. BER, eye height, and eye width) an optimum channel configuration can be selected. A method for selecting an optimum channel configuration is described.

Figure 3:
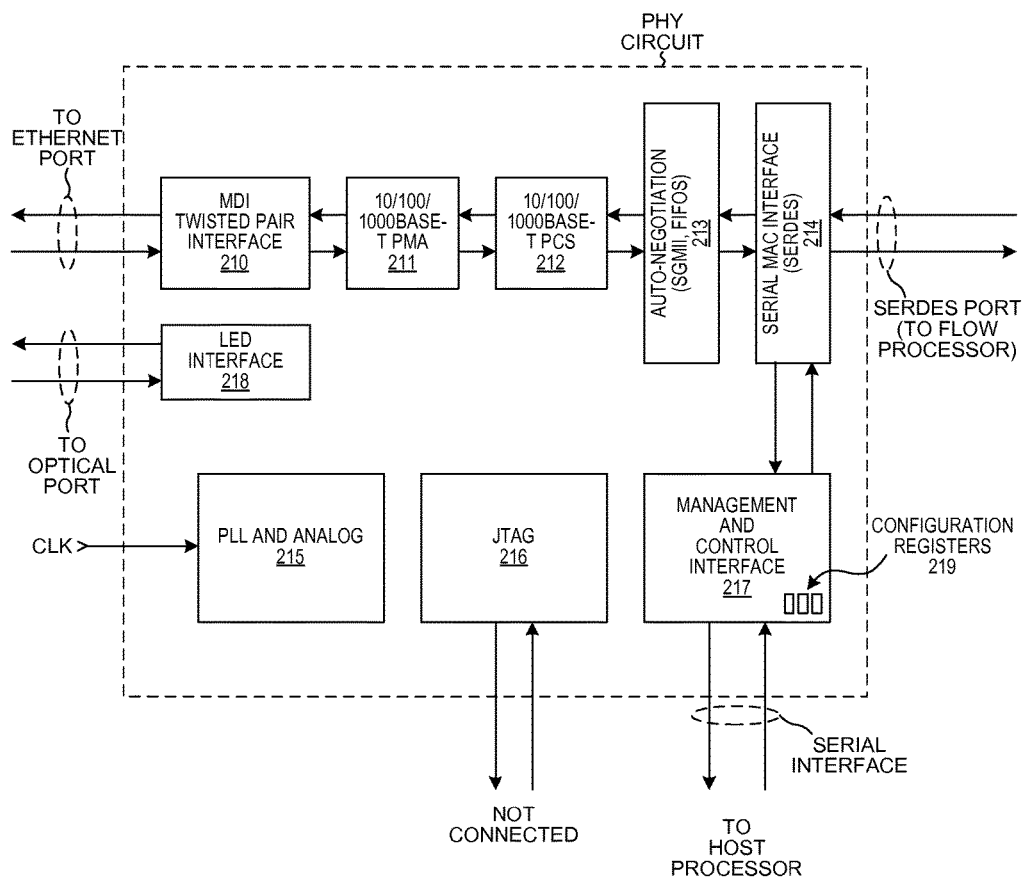
FIG. 3 is a block diagram of a physical layer core (circuit) (PHY).

FIG. 3 is a block diagram of a physical layer circuit (PHY). In one embodiment, the PHY includes an Medium-Dependent Interface (MDI) twisted pair interface 210, a 10/100/1000Base-T PMA 211, a 10/100/1000Base-T PCS 212, an auto-negotiation (SGMII, FIFOS) 213, a serial MAC interface (SERDES) 214, and a Light Emitting Diode (LED) interface 218. In one example, the serial MAC interface 214 communicates with a SERDES port of a flow processing device. The MDI twisted pair interface 210 is used to communicate electrical signals to an ethernet cable. The LED interface 218 is used to communicate optical signals to an optical fiber. Management and control interface 217 includes configuration registers 219 that are used to configure setting in the various blocks of the physical layer circuit. In the illustrated embodiment, as illustrated in FIG. 1, the host CPU causes the flow processing device to write to the configuration registers by sending a configuration command to from the CPU to the flow processing device via PCIE bus 9. It is noted that JTAG 216 is not connected to the CPU because the present embodiment allows for SERDES channel optimization without use of JTAG communication. This novel method of SERDES channel optimization without the use of JTAG communication is advantageous because JTAG requires additional printed circuit board traces and thus increasing printed circuit board area. This method is also advantageous because PCIe communication is much faster than JTAG communication therefore allowing for faster optimization of a SERDES channel.

FIG. 4 is a table illustrating exemplary transmitter physical layer circuit configuration registers. A first field is used to configure the main strength of the signal to be transmitted by the physical layer circuit. The main strength field is readable and writable and includes five bits. A value of "11111" configures the physical layer circuit to transmit the signal at maximum amplitude. A value of "00000" configures the physical layer circuit to transmit the signal at minimum amplitude. A second field is used to configure the precursor amplitude of the signal to be transmitted by the physical layer circuit. The precursor amplitude field is readable and writable includes 3 bits. A value of "111" configures the physical layer circuit to transmit the signal with a maximum precursor amplitude. A value of "000" configures the physical layer circuit a transmit the signal with a minimum precursor amplitude. A third field is used to configure the post cursor amplitude of the signal to be transmitted by physical layer circuit. The post cursor amplitude field is readable and writable and includes four bits. A value of "1111" configures the physical layer circuit to transmit the signal with a maximum post cursor amplitude. A value of "0000" configures the physical layer circuit to transmit the signal with a minimum post cursor amplitude. The three fields illustrated in FIG. 7 are exemplary in nature and not limiting. The transmitter physical layer circuit configuration registers may also include fields that control a variety of other transmitter parameters.

FIG. 5 is a table illustrating exemplary receiver physical layer circuit configuration registers. A first field is used to configure the signal threshold used by the receiver to determine the state of the bit. The signal threshold field is readable and writable includes four bits. A value of "1111" configures the physical layer circuit to apply a maximum threshold value. A value of "0000" configures the physical layer circuit to apply a minimum threshold. A second field is used to configure the equalization applied to received signals. A third field is used to configure the filtering applied to receive signals. A fourth field is used to configure again applied to receive signals. The game field is readable and writable includes four bits. A value of "1111" configures the physical layer circuit to apply the maximum gain to the received signal. A value of "0000" configures the physical layer circuit to apply the minimum gain to the received signal. The four fields illustrated in FIG. 8 are exemplary in nature and not limiting. The receiver physical layer circuit configuration registers may also include fields that control a variety of other receiver parameters.

Figure 6:
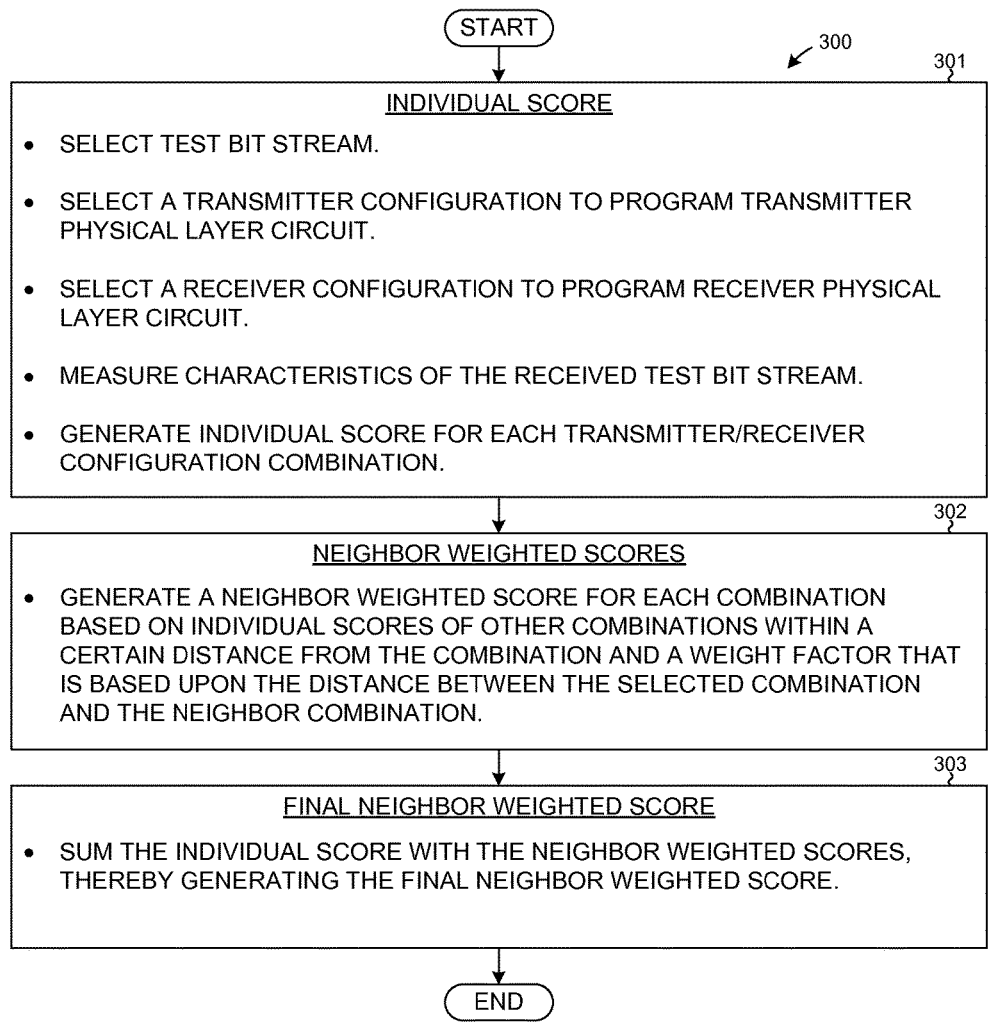
FIG. 6 is a flowchart diagram 300 illustrating an overview of neighbor weighted scoring process.

FIG. 6 is a flowchart diagram 300 illustrating an overview of neighbor weighted scoring. In step 301, an individual score is generated. The process of generating an individual score includes selecting a test bit stream, selecting a transmitter configuration to program the transmitter physical layer circuit, selecting a receiver configuration to program a receiver physical layer circuit, measuring characteristics of the received test bit stream (referred to as "gathered characteristic measurements" or "measurement data" herein), generating an individual score for each transmitter/receiver configuration combination. In step 303, a final score is generated by summing the individual score with the neighbor weighted score. In step 302, a neighbor weighted score is generated. The neighbor weighted score for each combination of transmitter-receiver configuration is based on an individual score of other transmitter-receiver combinations within a certain distance from the receiver-transmitter combination. The weight given to a neighboring individual score of other transmitter-receiver combination is based upon the distance between the select transmitter-receiver combination and the neighboring transmitter-receiver combination.

FIG. 7 is a diagram illustrating a multidimensional array of transmitter-receiver configuration combinations. The multidimensional array includes three columns of transmitter configuration values. The three columns include main strength, precursor, and post cursor fields. The multidimensional array also includes four columns of transmitter configuration values. The four columns include signal strength, equalization, filter, and gain fields. The multidimensional array also includes three columns of measured characteristic values. The three columns include bit error rate (BER), eye height, and eye width. FIG. 7 illustrates how the multidimensional array of configuration combinations is created. Each row of the multidimensional array is one combination of transmitter-receiver configuration combinations. The measurements resulting from each transmitter-receiver configuration combination is stored in the measured characteristic columns. A network device, such as illustrated in FIG. 1, will configure the transmitter physical layer circuit and the receiver physical layer circuit according to the configuration values of a given row and will measure the resulting characteristics of performance and will save the measured characteristics in the given row. The router will collect measured characteristics for all combinations of transmitter-receiver configurations and store each collected measured characteristic in the multidimensional array. In one example, the multidimensional arrays stored in the large capacity memory device 205 which is illustrated in FIG. 2.

As discussed above, a neighbor weighted score is generated based on the measured characteristics for each transmitter-receiver configuration. FIGS. 8-10 are tables illustrating weighting factors for different configuration fields.

FIG. 8 illustrates a weighting factor table for precursor values including two rows and five columns. The first row indicates the distance from a selected transmitter-receiver configuration combination. The second row indicates a weighting factor that is applied to the neighboring transmitter-receiver, configuration combinations. For example, the neighboring transmitter-receiver configuration combination located one combination away has a weighting factor of 0.15 applied to the measured characteristics resulting from that neighboring configuration. Whereas, the neighboring transmitter-receiver configuration combination located two combinations away has a weighting factor of 0.05 applied to the measured characteristics resulting from that neighboring configuration.

In another embodiment, the various weighting factors illustrated in FIG. 8 may be constant across all distances from a selected transmitter-receiver configuration combination.

FIG. 9 illustrates a weighting factor table for post cursor values including two rows and five columns. The first row indicates the distance from a selected transmitter-receiver configuration combination. The second row indicates a weighting factor that is applied to the neighboring transmitter-receiver, configuration combinations. For example, the neighboring transmitter-receiver configuration combination located one combination away has a weighting factor of 0.30 applied to the measured characteristics resulting from that neighboring configuration. Whereas, the neighboring transmitter-receiver configuration combination located two combinations away as a weighting factor of 0.10 applied to the measured characteristics resulting from that neighboring configuration.

In another embodiment, the various weighting factors illustrated in FIG. 9 may be constant across all distances from a selected transmitter-receiver configuration combination.

FIG. 10 illustrates a weighting factor table for main strength values including two rows and five columns. The first row indicates the distance from a selected transmitter-receiver configuration combination. The second row indicates a weighting factor that is applied to the neighboring transmitter-receiver, configuration combinations. For example, the neighboring transmitter-receiver configuration combination located one combination away as a weighting factor of 0.40 applied to the measured characteristics resulting from that neighboring configuration. Whereas, the neighboring transmitter-receiver configuration combination located two combinations away has a weighting factor of 0.25 applied to the measured characteristics resulting from that neighboring configuration.

In another embodiment, the various weighting factors illustrated in FIG. 10 may be constant across all distances from a selected transmitter-receiver configuration combination.

FIG. 11 is a diagram illustrating neighboring combinations in the main strength dimension. The selected transmitter receiver configuration combination includes a main strength value of "00011". Accordingly, a neighboring transmitter receiver configuration combination one unit away in the main strength dimension will have a main strength value of "00010" or "00100" Likewise, a neighboring transmitter receiver configuration combination two units away in the main strength dimension will have a mainstream value of "00001" or "00101". As described above, the weighting factor applied to each neighboring transmitter receiver configuration combination is based upon how far away the neighboring transmitter receiver configuration combination is from the selected transmitter receiver configuration combination.

FIG. 12 is a diagram illustrating neighboring combinations in the precursor dimension. The selected transmitter receiver configuration combination includes a precursor value of "011". Accordingly, a neighboring transmitter receiver configuration combination one unit away in the precursor dimension will have a precursor value of "010" or "100". Likewise, a neighboring transmitter receiver configuration combination two units away in the precursor dimension will have a precursor value of "001" or "101". As described above, the weighting factor applied to each neighboring transmitter receiver configuration combination is based upon how far away the neighboring transmitter receiver configuration combination is from the selected transmitter receiver configuration combination.

FIG. 13 is a diagram illustrating neighboring combinations in the post cursor dimension. The selected transmitter receiver configuration combination includes a post cursor value of "0011". Accordingly, a neighboring transmitter receiver configuration combination one unit away in the post cursor dimension will have a post cursor value of "0010" or "0100". Likewise, a neighboring transmitter receiver configuration combination two units away in the post cursor dimension will have a post cursor value of "0001" or "0101". As described above, the weighting factor applied to each neighboring transmitter receiver configuration combination is based upon how far away the neighboring transmitter receiver configuration combination is from the selected transmitter receiver configuration combination.

FIG. 14 is a diagram illustrating neighboring combinations in the signal threshold dimension. The selected transmitter receiver configuration combination includes a signal threshold value of "0011". Accordingly, a neighboring transmitter receiver configuration combination one unit away in the signal threshold dimension will have a signal threshold value of "0010" or "0100". Likewise, a neighboring transmitter receiver configuration combination two units away in the signal threshold dimension will have a signal threshold value of "0001" or "0101". As described above, the weighting factor applied to each neighboring transmitter receiver configuration combination is based upon how far away the neighboring transmitter receiver configuration combination is from the selected transmitter receiver configuration combination.

FIG. 15 is a diagram illustrating neighboring combinations in the equalization dimension. The selected transmitter receiver configuration combination includes an equalization value of "00011". Accordingly, a neighboring transmitter receiver configuration combination one unit away in the equalization dimension will have an equalization value of "00010" or "00100". Likewise, a neighboring transmitter receiver configuration combination two units away in the equalization dimension will have an equalization value of "00001" or "00101". As described above, the weighting factor applied to each neighboring transmitter receiver configuration combination is based upon how far away the neighboring transmitter receiver configuration combination is from the selected transmitter receiver configuration combination.

FIG. 16 is a diagram illustrating neighboring combinations in the filter dimension. The selected transmitter receiver configuration combination includes a filter value of "00011". Accordingly, a neighboring transmitter receiver configuration combination one unit away in the filter dimension will have a filter value of "00010" or "00100". Likewise, a neighboring transmitter receiver configuration combination two units away in the filter dimension will have a filter value of "00001" or "00101". As described above, the weighting factor applied to each neighboring transmitter receiver configuration combination is based upon how far away the neighboring transmitter receiver configuration combination is from the selected transmitter receiver configuration combination.

FIG. 17 is a diagram illustrating neighboring combinations in the gain dimension. The selected transmitter receiver configuration combination includes a gain value of "0011". Accordingly, a neighboring transmitter receiver configuration combination one unit away in the gain dimension will have a filter value of "0010" or "0100". Likewise, a neighboring transmitter receiver configuration combination two units away in the gain dimension will have a gain value of "0001" or "0101". As described above, the weighting factor applied to each neighboring transmitter receiver configuration combination is based upon how far away the neighboring transmitter receiver configuration combination is from the selected transmitter receiver configuration combination.

Figure 18:
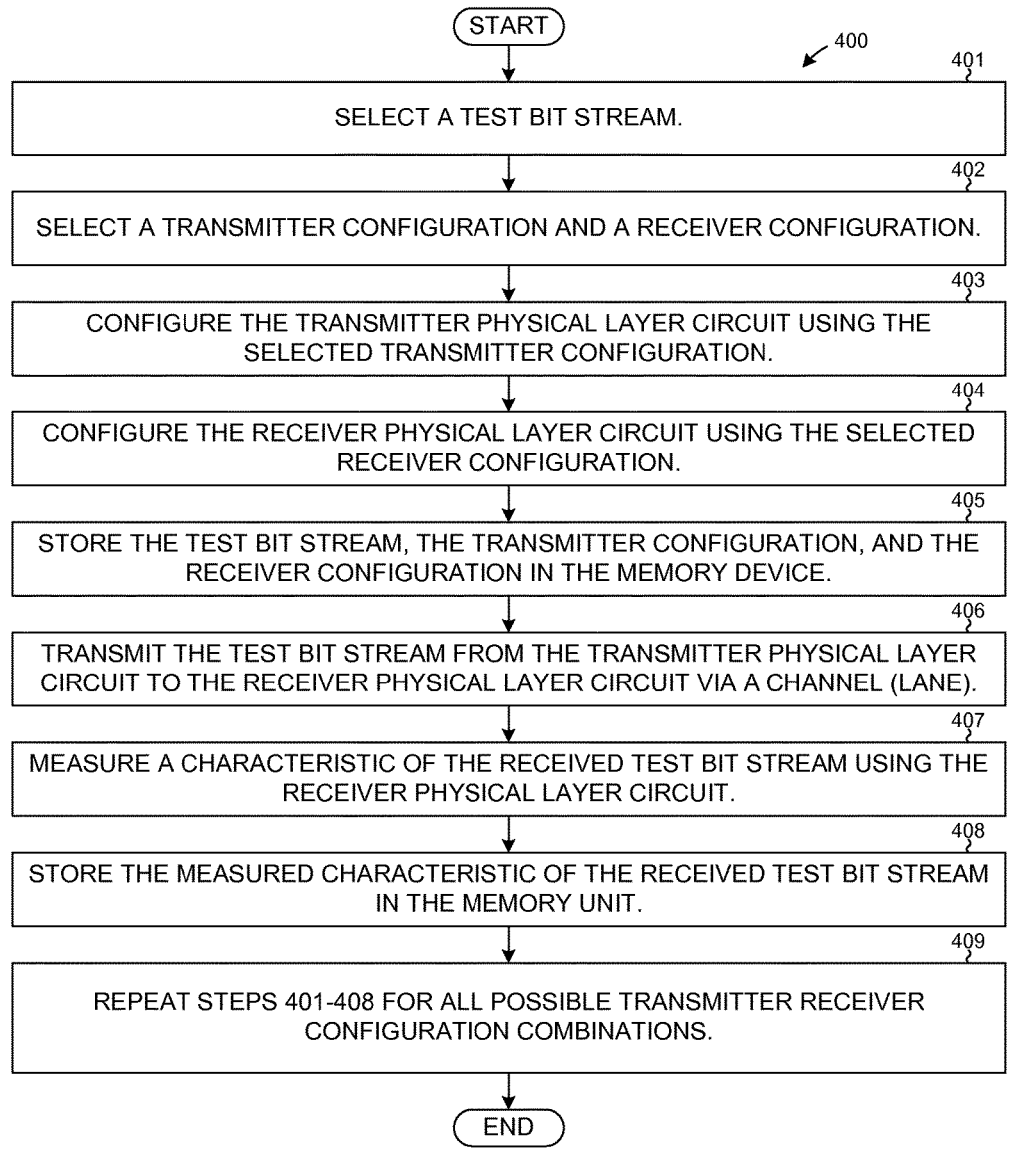
FIG. 18 is a flowchart 400 illustrating steps to generate a multidimensional array

FIG. 18 is a flowchart 400 illustrating steps to generate a multidimensional array. In step 401, a test bit stream is selected. In step 402, a transmitter configuration and a receiver configuration is selected. In step 403, a transmitter physical layer circuit is configured using the selected transmitter configuration. In step 404, a receiver physical layer circuit is configured using the selected receiver configuration. In step 405, the test bit stream, the transmitter configuration, and the receiver configuration is stored in a memory device. In step 406, the test bit stream is transmitted from the transmitter physical layer circuit and received by the receiver physical layer circuit via a channel. A channel is also referred to herein as a "lane". In step 407 the receiver physical layer circuit measures a characteristic of the received test bit stream. In step 408, the measured characteristic of the received test bit stream is stored in a memory unit. In step 409, steps 401 through 408 are repeated for all possible transmitter receiver configuration combinations.

Figure 19:
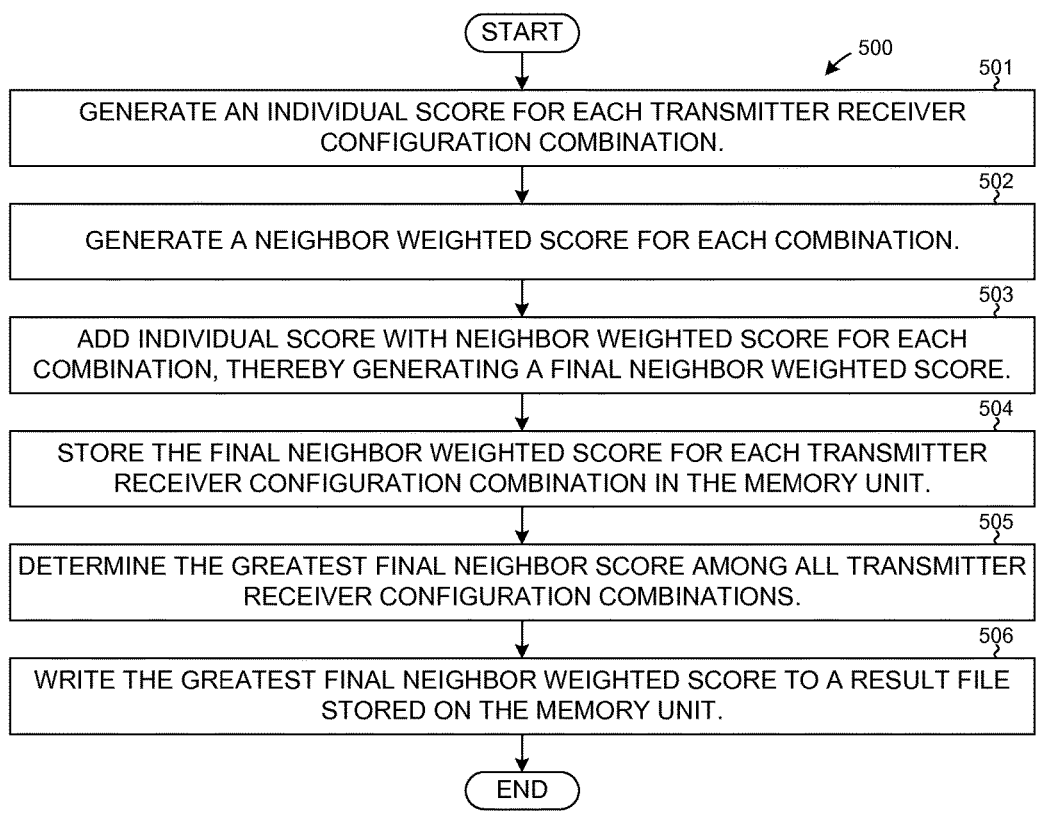
FIG. 19 is a flowchart 500 illustrating channel optimization utilizing neighboring weighted scoring

FIG. 19 is a flowchart 500 illustrating channel optimization utilizing neighboring weighted scoring. In step 501, an individual score is generated for each transmitter receiver configuration combination. In step 502, one or more neighbor weighted scores are generated for each transmitter receiver configuration combination. In step 503, the individual score is added to the one or more neighbor weighted scores thereby generating a final neighbor weighted score. In step 504, the final neighbor weighted score for each transmitter receiver configuration combination is stored in a memory. In step 505, the greatest final neighbor weighted score is determined. In step 506, the greatest final neighbor weighted score is written into result file store in the memory.

This process of SERDES channel optimization allows for management of post layout support of hardware bring up, specifically targeting transmit and receive sweeping for SERDES multi-mode interfaces. Specifically, SERDES channel optimization provides a per lane selection process that identifies a combination of transmitter and receiver configuration parameters that are surrounded by good neighbors in a multidimensional space. Configurations which yield good data integrity are clustered together. Given that uncontrolled variances (e.g. temperature, manufacturing variations, etc) may cause a shift in which values are best, it is necessary to identify points which have good neighbors distancing them from data integrity failures. This process of SERDES channel optimization determines best possible transmitter and receiver configurations for a given layout, thereby maximizing performance across the uncontrolled variances.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method, comprising:
(a) selecting a test bit stream;
(b) selecting a first transmitter configuration;
(c) selecting a first receiver configuration;
(d) configuring a first physical layer circuit with the first transmitter configuration;
(e) configuring a second physical layer circuit with the first receiver configuration;
(f) storing the test bit stream, the first transmitter configuration, and the first receiver configuration in a memory device;
(g) transmitting the test bit stream from the first physical layer circuit via a channel to the second physical layer circuit;
(h) measuring a characteristic of the test bit stream after passing through the channel, wherein the measuring of (h) is performed by the second physical layer circuit; and (i) generating a multidimensional array of measured characteristics, wherein the multidimensional array is organized by transmitter configuration and receiver configuration combinations, wherein the first physical layer circuit and the second physical layer circuit communicate via a bus to a host processor, and wherein steps (a) through (i) are performed without use of a JTAG communication, wherein the first receiver configuration includes a plurality of values that determine various settings for determining the value of each bit received by the second physical layer circuit, wherein the plurality of values include an equalizer bandwidth value, a differential termination value, a common-mode voltage value, an AC and DC coupling value, a signal threshold detection value, a continuous time linear equalization value, a DC gain value, an equalizer value, and an eye quality value, and wherein the plurality of values are programmed by writing to a register in the second physical layer circuit.

2. A method, comprising:
(a) selecting a test bit stream;
(b) selecting a first transmitter configuration;
(c) selecting a first receiver configuration;
(d) configuring a first physical layer circuit with the first transmitter configuration;
(e) configuring a second physical layer circuit with the first receiver configuration;
(f) storing the test bit stream, the first transmitter configuration, and the first receiver configuration in a memory device;
(g) transmitting the test bit stream from the first physical layer circuit via a channel to the second physical layer circuit;
(h) measuring a characteristic of the test bit stream after passing through the channel thereby obtaining measurements, wherein the measuring of (h) is performed by the second physical layer circuit;
(i) generating a multidimensional array of measured characteristics, wherein the multidimensional array is organized by transmitter configuration and receiver configuration combinations, wherein the first physical layer circuit and the second physical layer circuit communicate via a bus to a host processor, wherein steps (a) through (i) are performed without use of a JTAG communication, wherein steps (a) through (i) are performed for multiple combinations of transmitter configurations and receiver configurations, and wherein the measurements for each combination are stored in the memory device;
(j) selecting a combination that resulted in a minimum BER, and the greatest summation of eye height and eye width; and
(k) writing the selected combination to a file that is stored on the memory device.

3. The method of claim 2, wherein the first physical layer circuit and the second physical layer circuit are located on a flow processing device (FPD) integrated circuit.

4. A method, comprising:
(a) selecting a test bit stream;
(b) selecting a first transmitter configuration;
(c) selecting a first receiver configuration;
(d) configuring a first physical layer circuit with the first transmitter configuration;
(e) configuring a second physical layer circuit with the first receiver configuration;

(f) storing the test bit stream, the first transmitter configuration, and the first receiver configuration in a memory device;
(g) transmitting the test bit stream from the first physical layer circuit via a channel to the second physical layer circuit;
(h) measuring a characteristic of the test bit stream after passing through the channel thereby obtaining measurements, wherein the measuring of (h) is performed by the second physical layer circuit;
(i) generating a multidimensional array of measured characteristics, wherein the multidimensional array is organized by transmitter configuration and receiver configuration combinations, wherein the first physical layer circuit and the second physical layer circuit communicate via a bus to a host processor, wherein steps (a) through (i) are performed without use of a JTAG communication, wherein steps (a) through (i) are performed for multiple combinations of transmitter configurations and receiver configurations, and wherein the measurements for each combination are stored in the memory device, wherein the first physical layer circuit and the second physical layer circuit are located on a flow processing device (FPD) integrated circuit;
(j) generating an individual score for a first combination, wherein the individual score is based on characteristic measurements that resulted from the first combination;
(k) generating a neighbor weighted score, wherein the neighbor weighted score is based on characteristic measurements that resulted from a second combination that is within a first distance from the first combination in the multidimensional array and a weight factor associated with the first distance; and
(l) summing the individual score with the neighbor weighted score to generate a final neighbor weighted score for the one combination.

5. The method of claim 4, wherein the FPD integrated circuit is located on a network interface card (NIC).

6. A method, comprising:
(a) selecting a test bit stream;
(b) selecting a first transmitter configuration;
(c) selecting a first receiver configuration;
(d) configuring a first physical layer circuit with the first transmitter configuration;
(e) configuring a second physical layer circuit with the first receiver configuration;
(f) storing the test bit stream, the first transmitter configuration, and the first receiver configuration in a memory device;
(g) transmitting the test bit stream from a first physical layer circuit via a channel to the second physical layer circuit;
(h) measuring a characteristic of the test bit stream after passing through the channel thereby obtaining measurements, wherein the measuring of (h) is performed by the second physical layer circuit;
(i) generating a multidimensional array of measured characteristics, wherein the multidimensional array is organized by transmitter configuration and receiver configuration combinations, wherein the first physical layer circuit and the second physical layer circuit communicate via a bus to a host processor, and wherein steps (a) through (i) are performed without use of a JTAG communication, wherein steps (a) through (i) are performed for multiple combinations of transmitter configurations and receiver configurations, and wherein the measurements for each combination are stored in the memory device, wherein the first physical layer circuit and the second physical layer circuit are located on a flow processing device (FPD) integrated circuit;
(j) generating an individual score for a first combination, wherein the individual score is based on characteristic measurements that resulted from the first combination;
(k) generating a neighbor weighted score, wherein the neighbor weighted score is based on characteristic measurements that resulted from a plurality of combinations that are within a first distance from the first combination in the multidimensional array and a weight factor;
(l) summing the individual score with the neighbor weighted score to generate a final neighbor weighted score for the first combination; and
(m) storing the final neighbor weighted score in the memory device.

7. The method of claim 6, further comprising:
(n) repeating steps (j) through (m) for multiple combinations;
(o) selecting a combination that has the greatest final neighbor weighted score; and
(p) writing the selected combination to a file that is stored on the memory device.

8. A method, comprising:
(a) selecting a test bit stream;
(b) selecting a first transmitter configuration;
(c) selecting a first receiver configuration;
(d) configuring a first physical layer circuit with the first transmitter configuration;
(e) configuring a second physical layer circuit with the first receiver configuration;
(f) storing the test bit stream, the first transmitter configuration, and the first receiver configuration in a memory;
(g) transmitting the test bit stream from the first physical layer circuit via a channel to the second physical layer circuit;
(h) measuring a characteristic of the test bit stream at the second physical layer circuit after the test bit stream has passed through the channel thereby obtaining a measurement;
(i) generating a multidimensional array of measured characteristics, wherein the multidimensional array is organized by transmitter configuration and receiver configuration combinations, wherein the first physical layer circuit and the second physical layer circuit are part of a flow processing device (FPD) integrated circuit, wherein the first physical layer circuit and the second physical layer circuit communicate via a bus to a host processor, wherein the host processor is not a part of the FPD integrated circuit, wherein steps (a) through (i) are performed without use of a JTAG communication, wherein steps (a) through (i) are performed for multiple combinations of transmitter configurations and receiver configurations, and wherein the obtained measurement for each combination is stored in the memory;
(j) selecting a combination that resulted in an optimum channel configuration; and
(k) storing an indication of the selected combination in the memory.

9. The method of claim 8, wherein the test bit stream is a pseudo random bit stream, wherein the host processor configures the first physical layer circuit and the second physical layer circuit via the bus, and wherein the bus is a PCIe bus.

10. The method of claim 8, wherein the FPD integrated circuit is disposed on a network interface card (NIC) within a network device, and wherein the host processor is disposed within the network device but is not disposed on the NIC.

11. The method of claim 10, wherein the channel extends from the first physical layer circuit of the FPD integrated circuit, out of the FPD integrated circuit, across first SerDes connections, out of the NIC and back onto the NIC, across second SerDes connections, into the FPD integrated circuit, and to the second physical layer circuit of the FPD integrated circuit.

12. The method of claim 11, wherein the characteristic measured in (h) is a bit error rate (BER), and wherein the multiple combinations of transmitter configurations and receiver configurations involve a first combination in which a main strength transmitter configuration value has a first value and also involve a second combination in which the main strength transmitter configuration value has a second value.

13. The method of claim 11, wherein the characteristic measured in (h) is a bit error rate (BER), and wherein the multiple combinations of transmitter configurations and receiver configurations involve a first combination in which a gain receiver configuration value has a first value and also involve a second combination in which the gain receiver configuration value has a second value.

\* \* \* \* \*